(12) United States Patent
Maslana et al.

(10) Patent No.: US 11,117,706 B2
(45) Date of Patent: Sep. 14, 2021

(54) DISPENSING BASKET

(71) Applicant: Prince Castle LLC, Carol Stream, IL (US)

(72) Inventors: Eugene S. Maslana, Arlington Heights, IL (US); Glenn Schackmuth, Oswego, IL (US); Brian Smetana, Downers Grove, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 94 days.

(21) Appl. No.: 16/255,100

(22) Filed: Jan. 23, 2019

(65) Prior Publication Data

US 2019/0225368 A1 Jul. 25, 2019

Related U.S. Application Data

(60) Provisional application No. 62/620,829, filed on Jan. 23, 2018.

(51) Int. Cl.
*B65D 6/08* (2006.01)
*B65D 25/28* (2006.01)
*A47J 37/12* (2006.01)

(52) U.S. Cl.
CPC .......... *B65D 7/20* (2013.01); *A47J 37/1295* (2013.01); *B65D 25/2811* (2013.01)

(58) Field of Classification Search
CPC ........ B65D 7/14; B65D 7/20; B65D 21/0211; A47J 37/1295; A47J 43/18; A47J 47/01; A47J 42/50

USPC ....... 220/485, 491, 743, 912; 294/26.5, 137; 99/407, 403, 409, 410, 413

See application file for complete search history.

(56) References Cited

U.S. PATENT DOCUMENTS

| | | | |
|---|---|---|---|
| 2,635,528 A * | 4/1953 | Torres | A47J 37/1295 99/413 |
| 4,106,486 A | 8/1978 | Lee | |
| 4,321,859 A * | 3/1982 | Rimmeir | A47J 37/1295 99/416 |
| 4,502,372 A | 3/1985 | Mariotti | |
| 4,542,684 A | 9/1985 | Cantrell | |
| 5,305,686 A | 4/1994 | Svensson | |
| 5,359,924 A | 11/1994 | Roberts et al. | |
| 5,746,117 A * | 5/1998 | Chang | A47J 37/1219 99/407 |
| 5,819,933 A | 10/1998 | Hernandez | |
| 6,415,934 B1 | 7/2002 | Veltrop et al. | |
| 6,546,850 B1 | 4/2003 | Akiyama-Warren | |
| 7,383,963 B2 | 6/2008 | Svabek et al. | |
| 7,500,427 B2 | 3/2009 | Rosenzweig | |
| 8,037,812 B1 | 10/2011 | Sumner, Sr. | |
| 8,307,759 B2 | 11/2012 | Ketter, Jr. | |
| D691,426 S | 10/2013 | Brown et al. | |
| D696,058 S | 12/2013 | Crockett, Jr. | |

(Continued)

*Primary Examiner* — Robert Poon
(74) *Attorney, Agent, or Firm* — Andrus Intellectual Property Law, LLP

(57) ABSTRACT

A dispensing basket includes a pair of opposed side walls and a back wall that extends between the opposed side walls. A pair of front walls extend from the side walls in a direction towards each other and angled away from the back wall. The pair of front walls form a funnel with an opening between the pair of front walls. A floor extends between lower ends of the side walls, the back wall, and the front walls.

13 Claims, 8 Drawing Sheets

(56) References Cited

U.S. PATENT DOCUMENTS

| | | |
|---|---|---|
| D697,310 S | 1/2014 | Snider |
| 2007/0214968 A1 | 9/2007 | Larson et al. |
| 2007/0251397 A1 | 11/2007 | Dorsten et al. |
| 2007/0251517 A1 | 11/2007 | Sus et al. |
| 2008/0124438 A1 | 5/2008 | Forte et al. |
| 2009/0232952 A1 | 9/2009 | Cohn et al. |
| 2011/0247504 A1 | 10/2011 | Zangrande et al. |
| 2014/0144332 A1 * | 5/2014 | Svabek .................. B65D 7/20 99/403 |

* cited by examiner

DISPENSING BASKET

CROSS-REFERENCE TO RELATED APPLICATIONS

The present application claims priority of U.S. Provisional Patent Application No. 62/620,829, filed on Jan. 23, 2018, the contents of which are all hereby incorporated by reference in their entirety.

BACKGROUND

The present disclosure is related to the field of food preparation. More specifically, the present disclosure is related to a basket for holding and dispensing fried food.

In the food preparation industry, when a food item is to be deep fried, the food item is typically placed in a fry basket and immersed in heated oil. In a typical fast food setting, peak order demands are met by pre-preparing frequently ordered food items and holding these items in a holding bin or other device that produces a controlled environment to maintain food quality until it is provided to the customer at a later time. However, in the food preparation industry customer demands and greater control over food inventory has led to less advance production and more just in time cooking of food to fulfil customer orders.

In this cooking system, fried items may still need to dwell prior to assembling the customer order in order to slow, stop, or complete the cooking process, or to allow excess hot oil to drain from the food. However, this dwell time may make the additional step of placing the cooked food in a holding bin, as described above, less efficient as a foodservice worker must move the food into the holding bin, and then retrieve the food shortly thereafter. In order to avoid direct handling of the fried food by the foodservice worker often will use a tongs or other hand held utensil to move the fried food from the fry basket to the holding bin and then use the tongs or other hand held utensil to remove the fried food from the holding bin into a container to deliver the fried food to the customer.

BRIEF DISCLOSURE

An exemplary embodiment of a dispensing basket may be used for receiving fried food items and dispensing the fried food items into a container. The dispensing basket includes a pair of opposed side walls. A back wall extends between the opposed side walls. A pair of front walls extend from the side walls in a direction towards each other and angled away from the back wall. The pair of front walls form a funnel with an opening between the pair of front walls. A floor extends between lower ends of the side walls, the back wall, and the front walls. A handle is configured to be gripped by a user to impart a rotative movement about a lengthwise axis of the dispensing basket to dispense fried food items through the opening in the funnel.

Exemplary embodiments of the dispensing basket may further include a top wire that extends about the outer perimeter of the dispensing basket. The top wire defines an upward opening of the dispensing basket. The side walls, the back wall, and the front walls extend from the top wire.

A front wire may extend vertically from the top wire and horizontally below the floor interior of the front walls. A center wire may extend vertically from the top wire and horizontally below the floor. The side walls may be sloped towards the interior of the dispensing basket for at least a portion of the side walls between the top wire and the floor.

The front wire and the center wire maintain the outer perimeter of the dispensing basket along the side walls as the side walls slope towards the interior of the dispensing basket. A back wire may be connected to the center wire and extend rearward of the center wire to form a loop. The back wall may be sloped towards the interior of the dispensing basket for a least a portion of the back wall between the top wire and the floor and the loop is positioned below the back wall and interior the dispensing basket from the top wire. A handle wire may be secured at either end of the handle wire to vertical portions of the center wire. The handle wire may be positioned parallel to the back wire and a portion of the top wire connected to the back wall. The handle wire and the portion of the top wire connected to the back wall may form the handle. At least two vertical supports are spaced apart from one another and each secured to the top wire, the handle wire, and the back wire.

In exemplary embodiments of the dispensing basket, horizontal portions of the front wire and the back wire define a footprint perimeter and an area of the footprint perimeter is greater than an area of the floor. The area of the footprint perimeter may be less than an area of the perimeter defined by the top wire. The back wire may be positioned below the sloped portion of the back wall and internal the portion of the top wire connected to the back wall.

In exemplary embodiments of the dispensing basket, the back wall is sloped towards the interior of the dispensing basket for a least a portion of the back wall between the top wire and the floor. The side walls may be sloped towards the interior of the dispensing basket for at least a portion of the side walls between the top wire and the floor. A portion of the top wire may extend across the opening between ends of the front walls at a position above the floor, the portion of the top wire forming a ridge across the opening. A collection tray may be configured to receive at least a portion of the floor of the within the collection tray. The collection tray may include a lip and at least one clip is secured to at least one side wall. The at least one clip may resiliently engage the lip to releasably secure the at least one side wall to the collection tray.

An exemplary embodiment of a dispensing basket is configured for receiving fried food items and dispensing the fried food items into a container. The dispensing basket includes a top wire that extends about the perimeter of the dispensing basket and defines an upward opening of the dispensing basket. A pair of opposed side walls are connected to the top wire and are sloped towards the interior of the dispensing basket for at least a portion of the side walls. A back wall extends between the opposed side walls and is connected to the top wire. The back wall slopes towards the interior of the dispensing basket for a least a portion of the back wall. A pair of front walls extend from the side walls in a direction towards each other and angled away from the back wall. The pair of front walls form a funnel with an opening between respective ends of the pair of front walls. A floor extends between lower ends of the side walls, the back wall, and the front walls. A ridge is formed of a portion of the top wire that extends across the opening between the respective ends of the front walls at a position above the floor. A front wire extends in a vertical direction from the top wire and in a horizontal direction below the floor and interior of the front walls. A center wire extends in a vertical direction from the top wire and in a horizontal direction below the floor. A back wire is connected to the center wire and extends rearward of the center wire to form a loop. A handle wire is secured at either end to vertical portions of the center wire. The handle wire is positioned parallel to the back wire and a portion of the top wire connected to the back wall. The handle wire and the portion of the top wire connected to the back wall form a handle configured to be gripped by a user to impart a rotative movement about a lengthwise axis of the dispensing basket to dispense fried food items through the opening in the funnel.

An exemplary embodiment of a method of finishing and dispensing fried food items includes providing a dispensing basket. The dispensing basket exemplarily includes a pair of opposed side walls, a back wall extends between the opposed side walls, and a pair of front walls extend from the side walls in a direction towards each other and angled away from the back wall. The pair of front walls form a funnel with an opening between the pair of front walls. A floor extends between lower ends of the side walls, the back wall, and the front walls. A handle is configured to be gripped by a user. The method further includes receiving a plurality of fried food items through an upward opening of the dispensing basket. The plurality of fried food items are directed to the floor of the dispensing basket and into the funnel of the dispensing basket. The dispensing basket is rotated about a lengthwise axis by a rotative force imparted on the handle by a user to selectively dispense the fried food items through the opening of the funnel into a container for delivery to a customer.

In exemplary embodiments of the method, a ridge across the funnel opening retains the fried food items within the dispensing basket until the rotation of the dispensing basket about the lengthwise axis moves the fried food items past the ridge. Oil draining from the fried food items is received in a collection tray positioned below the floor of the dispensing basket.

BRIEF DESCRIPTION OF THE DRAWINGS

FIG. 9 is a close up partial front of the area bounded by line 9-9 of FIG. 6.

DETAILED DISCLOSURE

Figure 6:
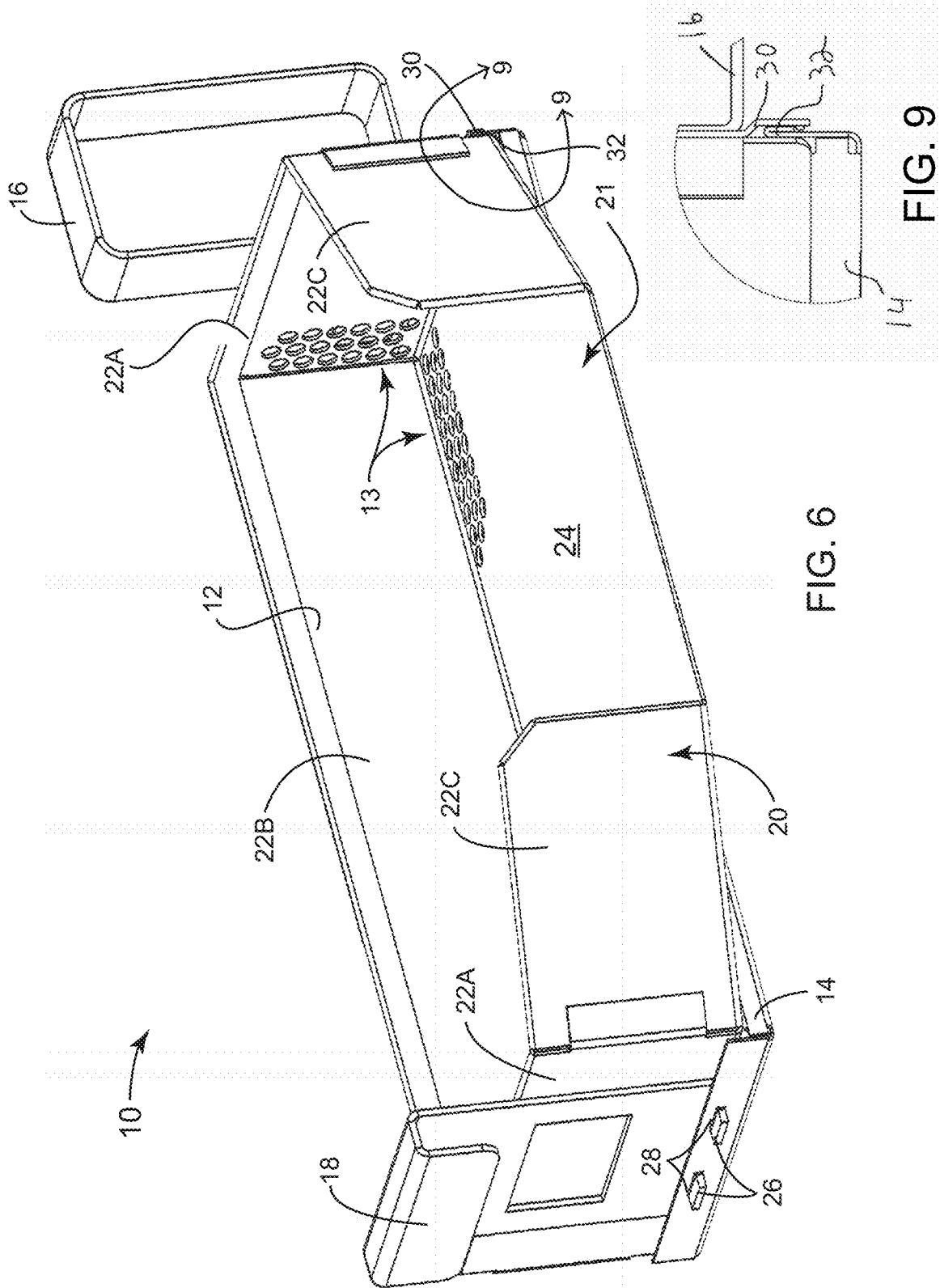
FIG. 6 is a front perspective view of a dispensing basket.

The Figures provide examples of dispensing baskets 10 as will be described in further detail herein. FIG. 6 is a front perspective view of the dispensing basket 10. The dispensing basket 10 is exemplarily shown in with a basket body 12 having a construction of sheet metal with a corner that includes perforations 13. However, it will be recognized that other embodiments of the dispensing basket may have the basket body 12 be fully or predominantly constructed of perforated metal, or take a shape similar to that as depicted in FIG. 6, but be constructed of bent and/or welded wire. The size and density of the perforations may be as exemplarily shown in FIG. 6, but other embodiments may have larger/smaller perforations and/or greater/lesser density of perforations. Similarly, wire size and spacing in a wire form embodiment may be within a range as would be recognized by a person of ordinary skill in the art. In embodiments, a specific food or foods intended to be held and dispensed from the dispensing basket 10 may impact dimensional selections.

Figure 7:
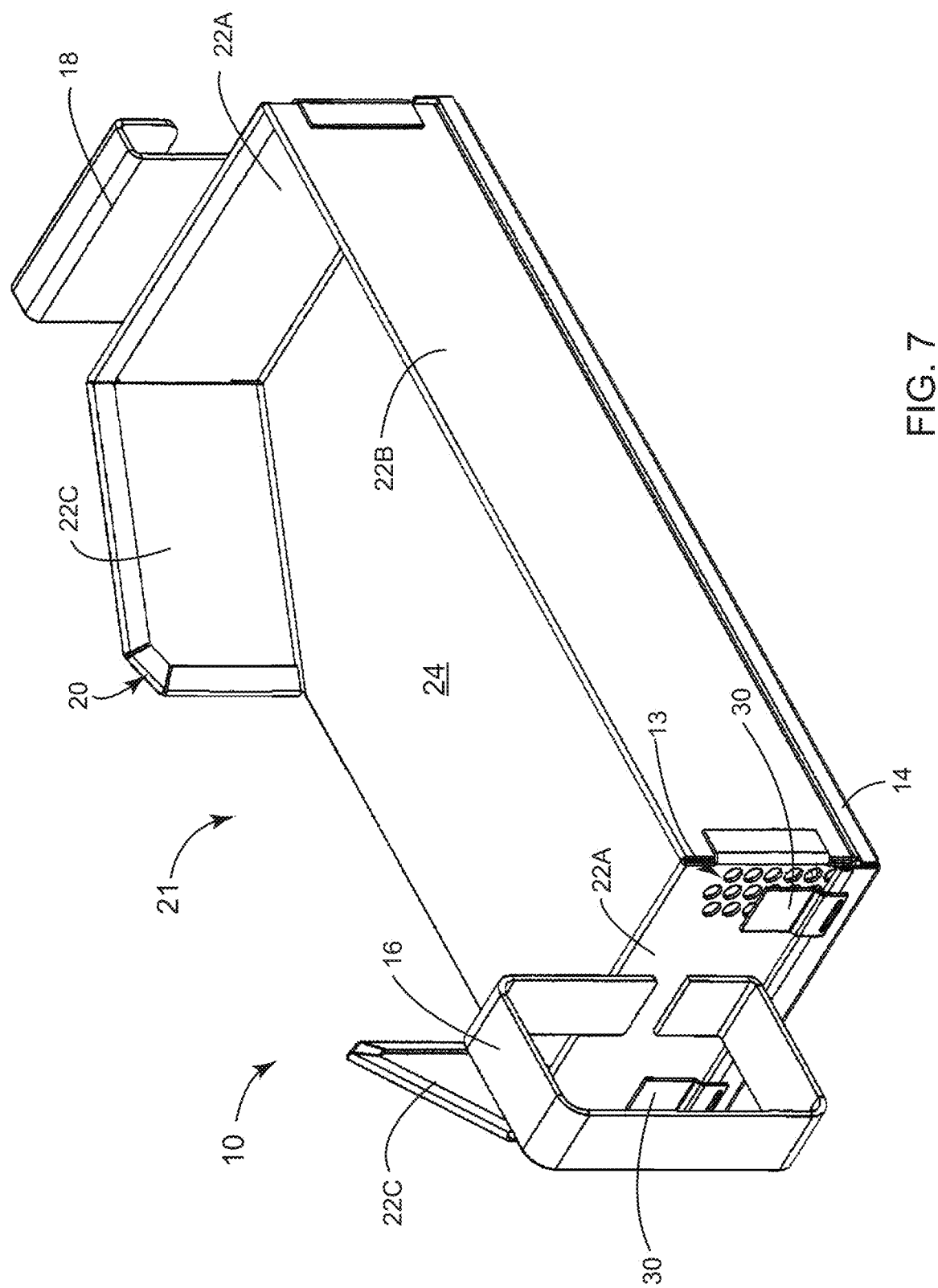
FIG. 7 is a rear perspective view of the embodiment of the dispensing basket.
Figure 8:
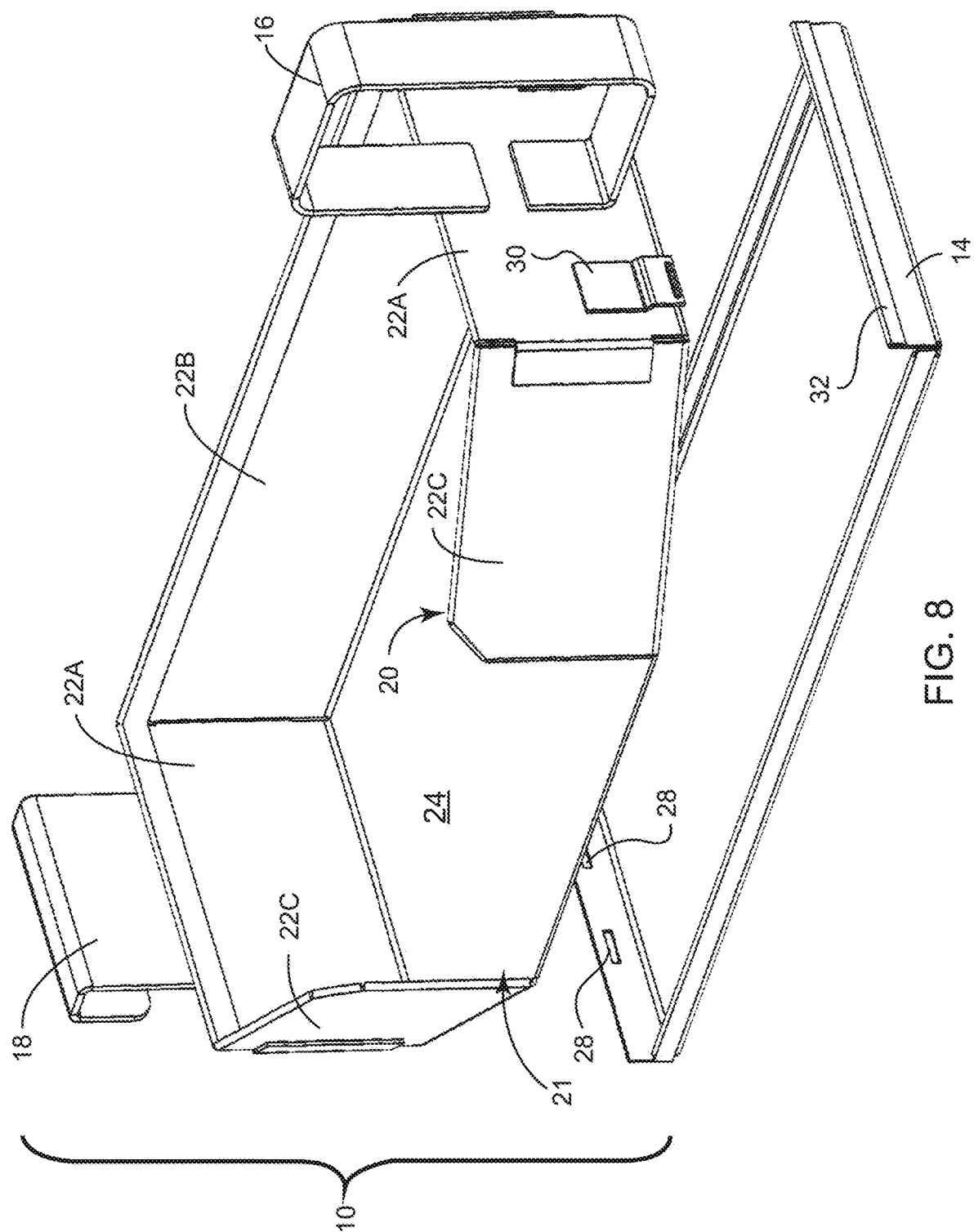
FIG. 8 is a front perspective view of the dispensing an exploded view of the dispensing basket separated from the collection tray.

A collection tray 14 is positioned below the basket body 12, such that the basket body 12 fits partially or wholly within the collection tray 14. The basket body 12 is positioned relative to the collection tray 14 in embodiments to collect oil and/or crumbs from the fried food items placed in the dispensing basket 10 prior to filling a container for delivery to the customer. As depicted in FIGS. 6-8, the collection tray 13 may be removably secured to the basket body 12, for example in the manners as described herein.

The basket body 12 is constructed of a plurality of walls 22. The plurality of walls 22 include opposed side walls 22A, and a back wall 22B. The plurality of walls 22, together with a floor 24 of the basket body 12 define an interior of the basket 10 in which the cooked food product is received. In embodiments as described above, the entirety of the floor 24 may be constructed of perforated metal or wire frame such that there is sufficient space for oil and crumbs of the fried food, for example crumbs of fried breading to pass through the perforations in the floor 24 and into the collection tray 14.

As shown in FIGS. 6-8, the basket 10 further includes a handle 16 that extends from one of the side walls 22A. The handle 16 provides a structure whereby a foodservice worker can grip the handle 16 and provide a rotative motion that rotates the basket 10 about a long axis of the basket 10 to dispense food items held within the interior of the food basket 10 therefrom. As shown in FIGS. 6-8, the handle 16 may extend generally vertically and perpendicularly to the floor 24 of the dispensing basket 10.

A hook 18 may be secured to the basket body 12 at the other of the side walls 22A opposite the handle 16. The hook 18 may be similar to those as provided on fry baskets configured to hold and retain uncooked food items within the heated oil of a deep fryer machine to cook the food items. In use, the hook 18 may be used in a similar manner to position and suspend the basket 10 above the heated oil of the deep fryer such that oil can drain from the dispensing basket 10 into the fryer.

The plurality of walls 22 further includes angled front walls 22C. The angled front walls 22C form a funnel 20 at the front of the basket body 12 intermediate the handle 16 and the hook 18. The floor 24 of the basket body 12 can extend to the angled front walls 22C and to the opening 21 of the funnel 20. The opening 21 is exemplarily dimensioned to be equal to or smaller than an opening of an associated container in which the food items are placed before being delivered to the customer.

As best shown in FIG. 8, the basket body 12 is selectively connectable and separable from the collection tray 14. Connection of the collection tray 14 to the basket body 12 helps to ensure that the oil and crumbs drained from the fried food placed in the dispensing basket 10 is directed into the collection tray 14. Separation of the collection tray 14 from the basket body 12 facilitates disposal of the collected oil and crumbs and further cleaning of the collection tray 14 as well as the basket 10 as a whole. The collection tray 14 is exemplarily depicted as only being coextensive in shape with a portion of the basket body 12. In the example depicted, the collection tray 14 does not extend below the funnel 20. However, in another exemplary embodiment, the collection tray 14 may match the entirety of the floor 24 of the basket body 12, including, but not limited to the portion of the floor 24 that forms the funnel 20. In still further embodiments the collection tray 14 may be larger than the perimeter of the dispensing basket. In an embodiment as depicted in the FIGS. 6-8, the portion of the floor 24 that constructs the funnel 20 may exemplarily be constructed of solid sheet metal or may be constructed of the perforated metal or wire frame as described above. Particularly in such embodiments, the basket body 12 may include a ridge (not depicted) that extends either the length of the body 12 prior to the funnel 20 or across the opening 21 of the funnel 20. For example such ridge may extend upwards from or be proximate to the floor 24 and provide an obstruction to retain food within interior of the basket 10 and positioned above the collection tray 14.

The basket body 12 is exemplarily secured to the collection tray 14 in a releasable manner. It will be recognized that other forms of releasable securement between the collection tray 14 and the basket body 12 may be used in view of the present disclosure. The basket body 12 exemplarily includes a pair of tabs 26 that are inserted through slots 28 located in an end wall of the collection tray 14. In an exemplary embodiment, the tabs 26 are located on a same side of the basket body 12 as the hook 18. The basket body 12 further includes clips 30 which are configured to resiliently engage a lip 32 of an end wall of the collection tray 14. The lip 32 may be exemplarily constructed of a crimped or folded piece of the sheet metal used to construct the collection tray 14. This is exemplarily shown in detail in FIGS. 6-9. The clip 30 is dimensioned such that the clip 30 deflects outwardly to receive the lip 32 therein after which the clip 30 returns to its normal position, or a near normal position and retains the basket body 12 secured to the collection tray 14. When a user seeks to separate the basket body from the collection tray 14, the user pulls upward on the handle. This causes a pivoting force about the tabs 26 positioned through the slots 28 and such force overcomes the bias of the clips 30 to release the lips 32 from the clips 30. After separation of the clips 30 and lips 32, the tab 26 may be withdrawn from the slots 28 by moving the entire basket body 12 to complete the separation.

In use, the basket 10 may facilitate the dwell and dispense of fried foods in a number of ways as is suitable for the work flow and food preparation process in a kitchen. In a first use, the dispensing basket 10 may be suspended about the fryer, for example by engagement of a fryer rack with the hook 18. For this may be similar to the manner in which fry baskets are similarly suspended. In an exemplary embodiment, the dispensing basket 10 may be placed in position over the fryer and a fry basket filled with cooked food product dumped into the dispensing basket 10 well before the food product is dispensed by pouring the food product our of the funnel 20. In the exemplarily embodiment used herein, the food product may be chicken tenders which are typically larger than other foods like tater tots, French fries, or chicken nuggets while typically having a more breaded surface, but also being smaller than a typical fried chicken patty for use in a sandwich. In other embodiments, the collection tray 14 may be positioned on a counter near a fryer and the basket body 12 secured to the collection tray 14 to collect any oil or crumbs while the food positioned therein dwells prior to being used for repairing a customer's order. In one exemplarily embodiment, the basket body 12 is removed from the collection tray 14 any time the food product is dispensed out of the funnel 20. In a still further exemplarily embodiment, the collection tray 14 remains secured to the basket body 12 and serves the collection purpose and function while the food product is dispensed and the collection tray 14 as only removed from the basket body 12 to clean, replace, or service the collection tray 14.

In a still further exemplarily embodiment, the dispensing basket 10 may include one or more additional securing or attachment members such that a dispensing basket 10 may be securable over the top of a commonly sized frying basket. Securement of a frying basket to the dispensing basket 10 is an opening-to-opening manner may facilitate the ease of transfer of the food product from the fry basket to the basket body 12 simply by rotating the secured baskets over to dump the food product from the fry basket into the dispensing basket 10. This food facilitates transfer of the cooked food product while limiting chances for waste and lost food product.

FIGS. 1-5 further depict a dispensing basket 10. The dispensing basket 10 shown in FIGS. 1-5 is an example of a wire form dispensing basket 10 as described above. The wire form construction of the dispensing basket 10 includes a plurality of bent wires that are secured to one another for example by welding. While not limiting, the dispensing basket 10 may include two sizes or gauges of wire, with a larger cross-sectional diameter wire forming the structural components of the dispensing basket 10 and wires of a smaller cross-sectional diameter extending between the larger wires to complete the body of the dispensing basket 10.

Figure 1:
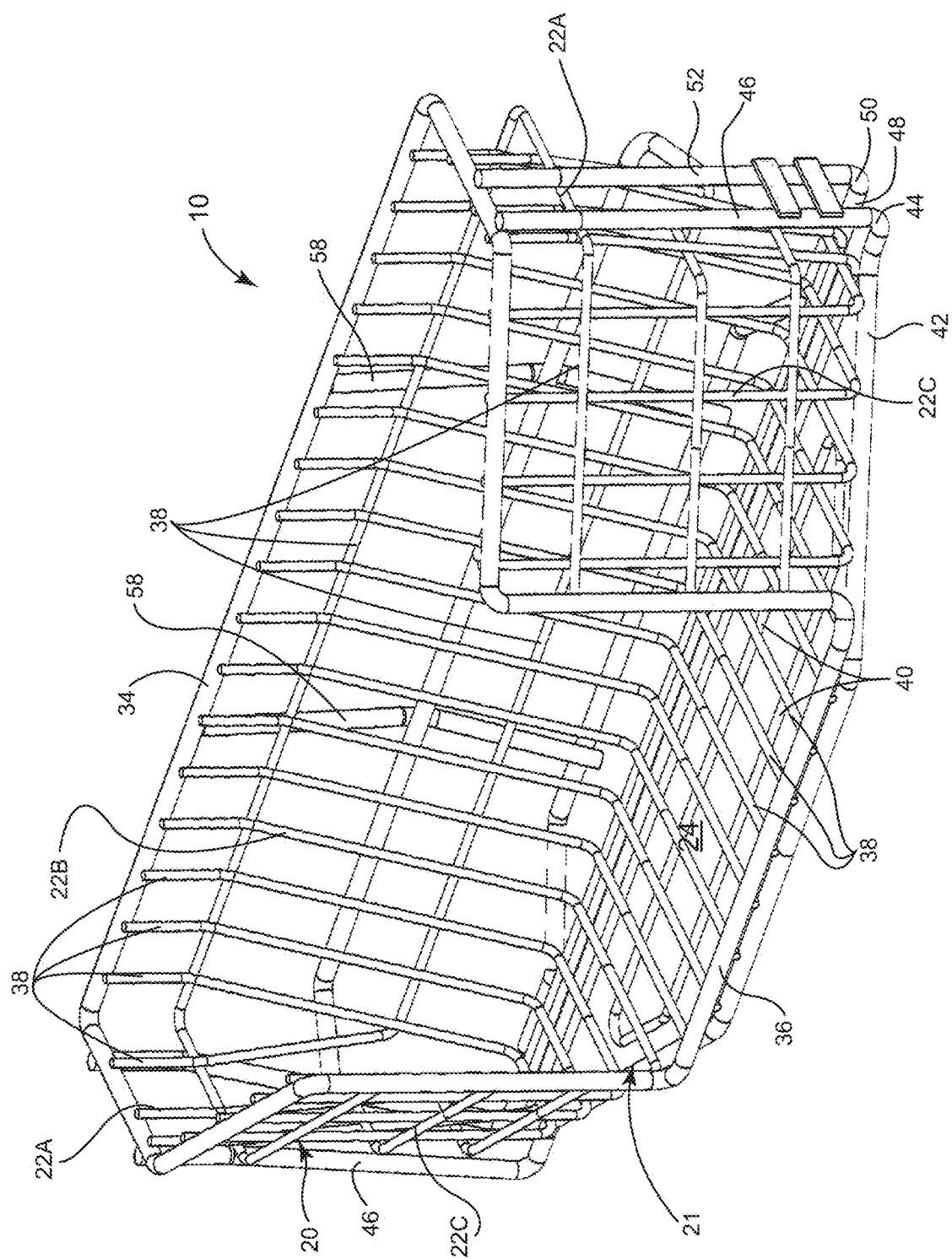
FIG. 1 is a front perspective view of a dispensing basket.
Figure 2:
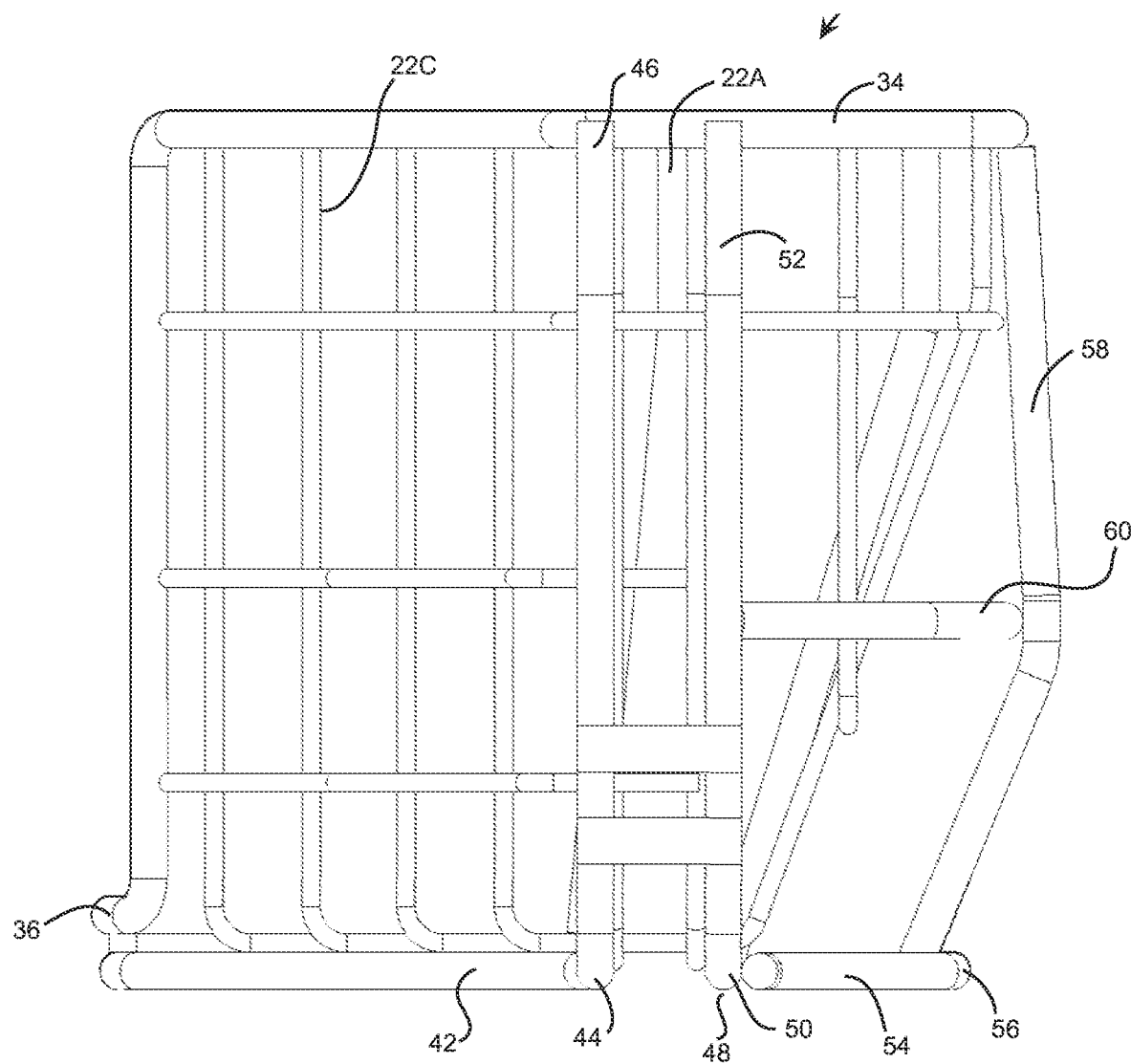
FIG. 2 is a side view of the dispensing basket.
Figure 3:
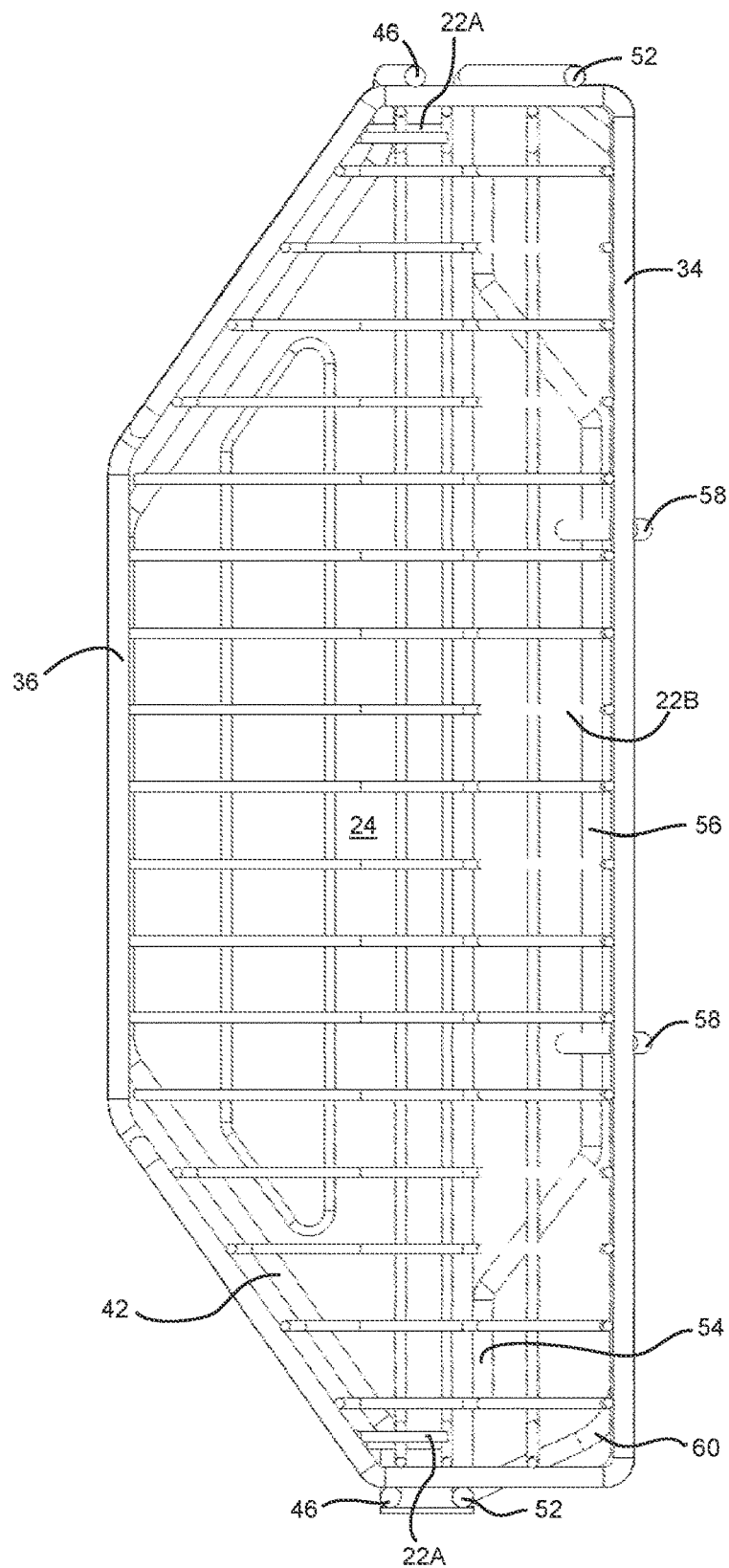
FIG. 3 is a top view of the dispensing basket.

As best seen in the front perspective view of the dispensing basket 10 of FIG. 1 and the top view of the dispensing basket 10 of FIG. 3, a top wire 34 generally defines an outer perimeter of the dispensing basket 10, smaller gauge wires extending internal of the top wire 34. The top wire 34 also generally defines the upward opening of the dispensing basket 10, an opening through which the fried food items are received into the dispensing basket 10. The dispensing basket includes a plurality of walls 22, including side walls 22A and back wall 22B. The dispensing basket also includes angled front walls 22C, that together with a portion of the floor 24 define a funnel 20. The side walls 22A and the back wall 22B are further inwardly sloped, angling from the top wire 34 to the floor 24 of the dispensing basket 10. While not limiting, FIGS. 1-5 depict the side walls 22A and the back wall 22B first extending with a vertical portion from the top wire 34, followed by an angled portion between the vertical portion and the floor 24. As best seen in FIG. 3, this maintains a maximum cross-sectional area of the dispensing basket 10 at the top for receiving the fried food items, exemplarily poured directly from a fry basket, while reducing the area of the floor 24 upon which the fried food items are held, such that the fried food items are confined towards the funnel 20 to facilitate dispense from the dispensing basket 10 into containers for delivery to the customer.

The top wire 34 further defines a ridge 36 across the opening 21 of the funnel 20. As described above, the ridge 36 helps to retain the fried food items in the dispensing basket until dispensed into a container by the foodservice worker. The walls 22 and the floor 24 are formed by matrix of overlapped wires. While not limiting, as depicted, the back wall 22B and the floor 24 are include a plurality of wires 38 that extend perpendicular to the ridge 36, extending from the top wire 34 at the top of the back wall 22B to the top wire 34 defining the ridge 36 or the top wire 34 defining the tops of the angled front walls 22C of the funnel 20. This plurality of wires 38 overlies a plurality of wires 40 oriented perpendicular to the plurality of wires 38. The plurality of wires 38 are thus positioned internal to the dispensing basket 10 from the plurality of wires 40 and thereby provide a series of rails that help to direct fried food items within the dispensing basket 10 towards the opening 21 of the funnel 20.

Referring to FIG. 2 which is a side view of the dispensing basket 10, as well as the rest of FIGS. 1-5, the dispensing basket 10, in addition to top wire 34 includes other structural wires. A front wire 42 defines the bottom perimeter of the funnel 20, extending below the top wire 34 along the angled side walls 22C and the ridge 36. The front wire 42 further includes a right elbow 44 after which a vertical portion 46 extends exterior of the side walls 22A. As can be seen in the figures, the vertical portion 46 may bend or slope in the depth dimension as the vertical portion 46 extends in the vertical direction between the portion of the front wire that extends in the horizontal direction and the top wire 34. As will be described in further detail herein, since the side walls 22A angle inwardly from the outer perimeter of the dispensing basket, the front wire 42, including the vertical portion 46 thereof, help to maintain a footprint of the dispensing basket that is similar to that of the cross-sectional area of the dispensing basket at the top, to provide stability to the dispensing basket 10.

A center wire 48 extends horizontally along the length of the dispensing basket 10. The center wire 48 also includes right elbows 50 after which vertical portions 52 extend along the side walls 22A to the top wire 34. As can be seen in the figures, the vertical portion 52 may bend or slope in the depth dimension as the vertical portion 52 extends in the vertical direction between the portion of the center wire that extends in the horizontal direction and the top wire 34. The vertical portions 52 serve a similar function as the vertical portions 46 to maintain the footprint of the dispensing basket 10 relative to the top wire 34. The center wire 48 exemplarily underlies the floor 24 at the transition from the angles portion of the back wall 22B to the floor 24.

A back wire 54 is connected between opposite ends of the center wire 48. The back wire 54 defines a loop 56 that extends rearward of the center wire 48. As seen in FIG. 3, while the back wire 54 is internal of the top wire 34, the back wire 54 further extends the footprint of the dispensing basket 10 into the space below the angled portion of the back wall 22B in the direction of the top wire 34. Vertical supports 58 extend from the top wire 34 to the back wire 54 connecting to the back wire 54 at the loop 56. A handle 60 oriented horizontally and parallel to the dispensing basket 10 is formed by the back portion of the top wire 34, the loop 56 of the back wire 54, the vertical supports 58 and a handle wire 62 that is connected from the vertical portions 52 of the center wire and to the vertical supports 58.

When the dispensing basket 10 is resting on a surface, for example a collection tray or a table top, the dispensing basket 10 rests upon the front wire 42, the center wire 48 and the back wire 54. The front wire 42 and the back wire 54 thus define a footprint perimeter of the dispensing basket, the perimeter of the base upon which the dispensing basket 10 is supported on the surface. Because the back wire 54 extends rearward from the center wire 48 to form the loop 56, the footprint perimeter defines a greater area than the area of the floor 24. As the side walls 22A and rear wall 22B angle inwardly from the top wire 34, the floor 24 has an area smaller than the area of the upward opening as defined by the perimeter of the dispensing basket provided by the top wire 34. The footprint perimeter, having a greater area than the area of the floor 24 makes the dispensing basket more stable. It will be recognized that in an exemplary, but non-limiting embodiment, the loop 56 ends interior of the portion of the top wire 34 to which the rear wall 22B is connected, and thus the footprint perimeter area may be smaller than the are of the upward opening defined by the top wire 34. However, it will be recognized that in other embodiments, the footprint perimeter area may be greater than the area of the upward opening.

Figure 4:
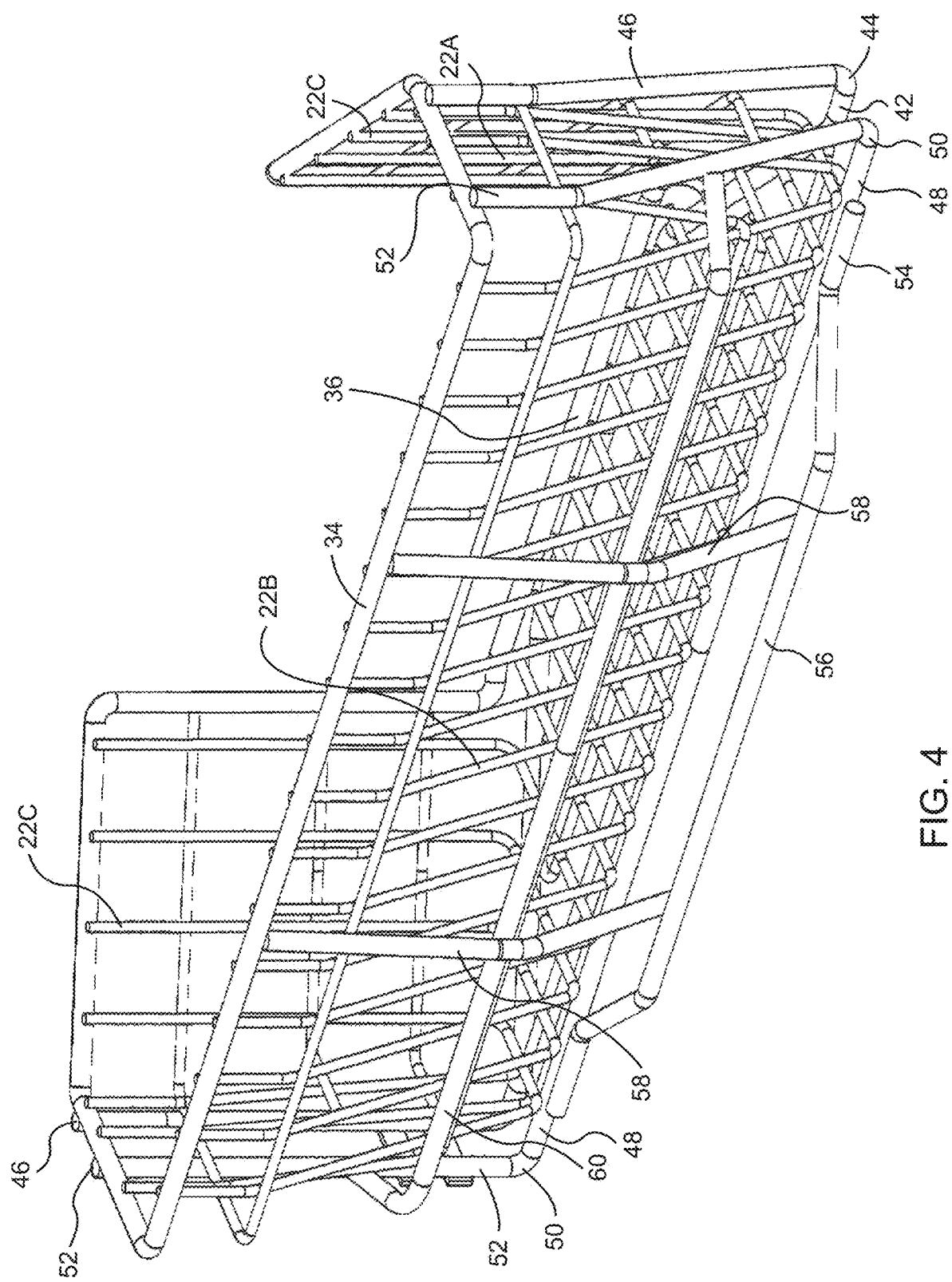
FIG. 4 is a rear perspective view of the dispensing basket.
Figure 5:
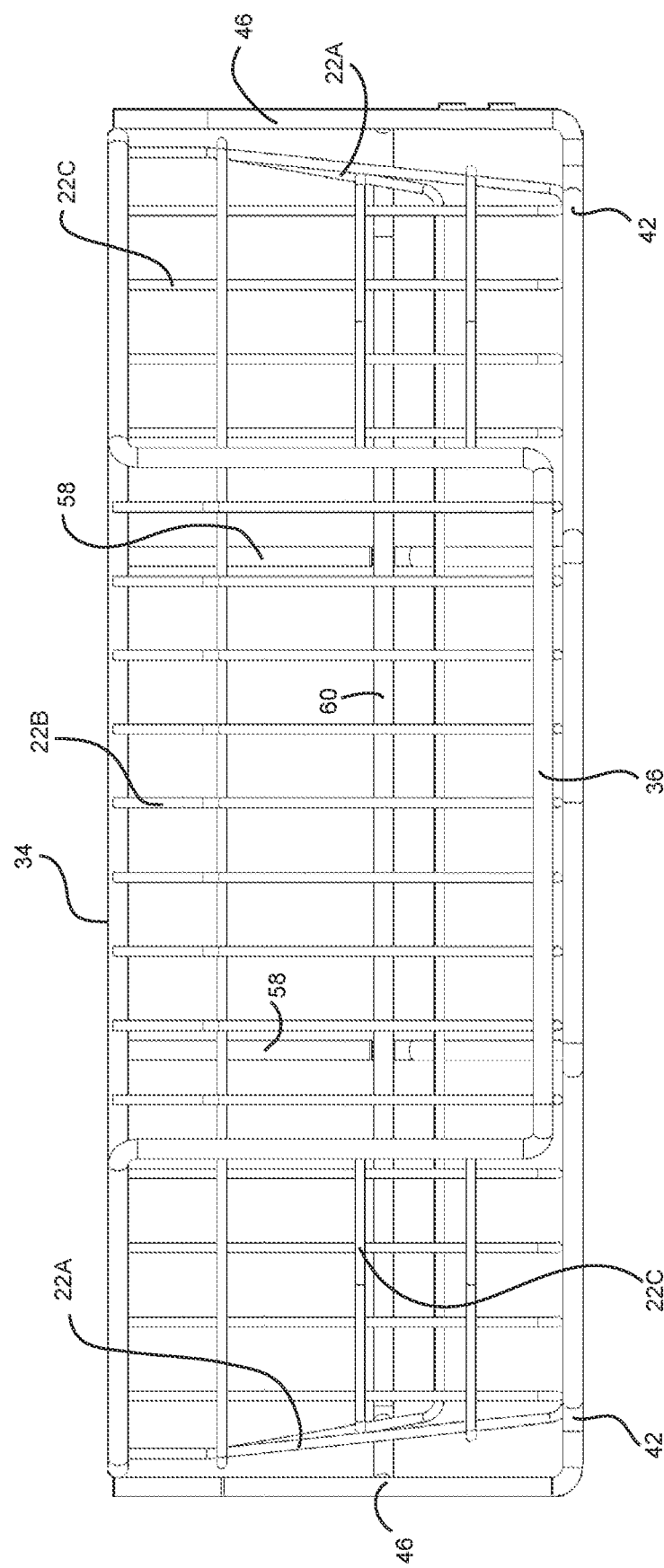
FIG. 5 is a front view of the dispensing basket.

The handle 60 is best shown in FIG. 4, which is a rear perspective view of the dispensing basket 10. The handle wire 62, between the vertical supports 58 runs parallel to the top wire 34. In use the foodservice worker is able to grip the basket 10 with the thumb either along or across the top wire 34, while the fingers grip the handle wire 62 between the vertical supports 58. The vertical supports 58 help to provide rigidity to the handle wire 62 at the area gripped by the user. With the handle held in this manner, the worker can rotate the basket about a long, or lengthwise, axis of the basket to dispense fried food from within the basket through the opening 21 of the funnel 20.

While not depicted in FIGS. 1-5, the dispensing basket 10 may be used with a collection tray. The collection tray as used with the dispensing basket may exemplarily be larger than the outer perimeter of the dispensing basket and therefore be set entirely within the perimeter of the collection tray. The collection tray need not be deep, but merely function to retain any oil or crumbs that drain from the fried food while the fried food dwells in the dispensing basket 10. As the front wire 42 and center wire 48 underlie the plurality of wires 38, 40 that form the floor 24 upon which the fried food rests, a space is provided between the fried food and the collection tray for the oil and crumbs to collect within the collection tray.

The inventors have discovered that a device which can function to both hold the food product for a short dwell time as well as dispense the product therefrom can provide an efficiency to the food preparation process for example implementing just in time cooking for example in a quick service restaurant setting. Embodiments of the dispensing baskets as have been disclosed herein provide the advantage of improved workflow for the food service worker in handling and packaging fried foods for delivery to a customer. The improved workflows enabled by the dispensing baskets as disclosed herein facilitate assembling a customer order with just in time, or small batch cooking of fried food items temporally proximate to receipt of customer orders due to the efficiency gains in cooked product draining and/or dwell and packaging in containers for delivery to the customer.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A dispensing basket for receiving fried food items and dispensing the fried food items into a container, the dispensing basket comprising:
   a pair of opposed side walls;
   a back wall that extends between the opposed side walls;
   a pair of front walls that extend from the side walls in a direction towards each other and angled away from the back wall, wherein the pair of front walls form a funnel with an opening between ends of the respective front walls;
   a floor extending between lower ends of the side walls, back wall, and front walls;
   a handle configured to be gripped by a user to impart a rotative movement about a lengthwise axis of the dispensing basket to dispense fried food items through the opening in the funnel;
   a top wire that extends about the perimeter of the dispensing basket and defines an upward opening of the dispensing basket and the side walls, back wall, and front walls extend from the top wire;
   a front wire that extends in a vertical direction from the top wire and in a horizontal direction below the floor interior of the front walls;
   a center wire that extends in the vertical direction from the top wire and in a horizontal direction below the floor; and
   a back wire connected to the center wire and extending rearward of the center wire to form a loop.

2. The dispensing basket of claim 1, wherein the back wall is sloped towards the interior of the dispensing basket for a least a portion of the back wall between the top wire and the floor and the loop is positioned below the back wall and interior the dispensing basket from the top wire.

3. The dispensing basket of claim 2, further comprising a handle wire secured at either end to vertical portions of the center wire, wherein the handle wire is positioned parallel to the back wire and a portion of the top wire connected to the back wall, wherein the handle wire and the portion of the top wire connected to the back wall form the handle.

4. The dispensing basket of claim 3, further comprising at least two vertical supports spaced apart from one another and each secured to the top wire, the handle wire, and the back wire.

5. The dispensing basket of claim 1, wherein horizontal portions of the front wire and the back wire define a footprint perimeter and an area of the footprint perimeter is greater than an area of the floor.

6. The dispensing basket of claim 5, wherein the area of the footprint perimeter is less than an area of the perimeter defined by the top wire.

7. The dispensing basket of claim 1, further comprising a collection tray configured to receive at least a portion of the floor of the within the collection tray.

8. The dispensing basket of claim 7, wherein the collection tray comprises a lip and at least one clip is secured to at least one side wall, wherein the at least one clip resiliently engages the lip to releasably secure the at least one side wall to the collection tray.

9. The dispensing basket of claim 1, wherein the back wall is sloped towards the interior of the dispensing basket for a least a portion of the back wall between the top wire and the floor.

10. The dispensing basket of claim 1, wherein the side walls are sloped towards the interior of the dispensing basket for at least a portion of the side walls between the top wire and the floor.

11. The dispensing basket of claim 1, wherein a portion of the top wire extends across the opening between ends of the front walls at a position above the floor, the portion of the top wire forming a ridge across the opening.

12. The dispensing basket of claim 1, wherein the side walls are sloped towards the interior of the dispensing basket for at least a portion of the side walls between the top wire and the floor, wherein the front wire and the center wire maintain the outer perimeter of the dispensing basket along the side walls as the side walls slope towards the interior of the dispensing basket.

13. A dispensing basket for receiving fried food items and dispensing the fried food items into a container, the dispensing basket comprising:
   a top wire that extends about the perimeter of the dispensing basket and defines an upward opening of the dispensing basket;
   a pair of opposed side walls connected to the top wire and are sloped towards the interior of the dispensing basket for at least a portion of the side walls;
   a back wall that extends between the opposed side walls and is connected to the top wire and slopes towards the interior of the dispensing basket for a least a portion of the back wall;
   a pair of front walls that extend from the side walls in a direction towards each other and angled away from the back wall, wherein the pair of front walls form a funnel with an opening between respective ends of the front walls;
   a floor extending between lower ends of the side walls, back wall, and front walls;
   a ridge formed of a portion of the top wire that extends across the opening between ends of the front walls at a position above the floor;
   a front wire that extends vertically from the top wire and horizontally below the floor interior of the front walls;
   a center wire that extends vertically from the top wire and horizontally below the floor;
   a back wire connected to the center wire and extending rearward of the center wire to form a loop; and
   a handle wire secured at either end to vertical portions of the center wire, wherein the handle wire is positioned parallel to the back wire and a portion of the top wire connected to the back wall, wherein the handle wire and the portion of the top wire connected to the back wall form a handle configured to be gripped by a user to impart a rotative movement about a lengthwise axis of the dispensing basket to dispense fried food items through the opening in the funnel.

* * * * *